United States Patent [19]
Fukumura et al.

[11] Patent Number: 6,027,835
[45] Date of Patent: Feb. 22, 2000

[54] CELL ELECTRODE SHEET WITH DISPLACED ELECTRODE DEPOLARIZING MIXES

[75] Inventors: Kenichi Fukumura, Miyagi; Hideki Tomiyama, Kanagawa; Mitsutoshi Tanaka, Miyagi, all of Japan

[73] Assignees: Fuji Film Celltec Co., Ltd., Miyagi; Fuji Photo Film Co., Ltd., Kanagawa, both of Japan

[21] Appl. No.: 08/988,180

[22] Filed: Dec. 10, 1997

[30] Foreign Application Priority Data

Dec. 11, 1996 [JP] Japan .................................. 8-331095

[51] Int. Cl.[7] ....................................................... H01M 4/64
[52] U.S. Cl. ................................................................ 429/233
[58] Field of Search ............................ 429/94, 164, 241, 429/242, 243, 209, 233; 29/2, 623.1, 623.3, 623.5

[56] References Cited

U.S. PATENT DOCUMENTS

| | | | |
|---|---|---|---|
| 4,333,994 | 6/1982 | Urry | 429/94 |
| 5,554,460 | 9/1996 | Wu et al. | 429/164 X |

*Primary Examiner*—Maria Nuzzolillo
*Assistant Examiner*—Susy Tsang
*Attorney, Agent, or Firm*—Sughrue, Mion, Zinn, Macpeak & Seas, PLLC

[57] ABSTRACT

An electrode sheet having a current collector coated with electrode depolarizing mix on both upper and lower surfaces of the current collector, wherein: the electrode sheet has a portion of the current collector not coated with the electrode depolarizing mix; and the electrode depolarizing mix coated ends on both the upper and lower surfaces of the current collector are shifted by 0.3 mm or longer and 30 mm or shorter in a longitudinal direction of the electrode sheet.

11 Claims, 4 Drawing Sheets

CELL ELECTRODE SHEET WITH DISPLACED ELECTRODE DEPOLARIZING MIXES

This application is based on Japanese patent application No. 8-331095 filed on Dec. 11, 1998, the entire contents of which are incorporated herein by reference.

BACKGROUND OF THE INVENTION a) Field of the Invention

The present invention relates to coating techniques of an electrode sheet of a non-aqueous cell, capable of improving productivity, providing a high discharge potential, and stabilizing a cell life time.

b) Description of the Related Art

In the course of developments on electronic apparatuses using secondary cells as their power sources, demands for a high capacity of secondary cells are rapidly expanding. To meet the requirement of high capacity, lithium secondary cells are being developed in place of nickel cadmium cells and nickel hydrogen cells. As compared to conventional secondary cells, although lithium secondary cells have already a higher capacity, a much higher capacity is still desired. In addition to developments on electrode materials, increasing the amount of electrode materials filled in a cell can has been studied in order to realize high capacity cells. Approaches to increasing the amount of electrode materials include an increased amount of electrode material capable of being coated and a reduced void factor of electrode material through pressing a coated electrode sheet. FIG. 3 is a cross sectional view of a conventional electrode sheet taken along its longitudinal direction. Generally, an electrode sheet has depolarizing mix layers 52a and 52b formed on both sides of a current collector 51 by coating liquid containing electrode material (hereinafter called depolarizing mix coating liquid). The total thickness of the depolarizing mix layers 52a and 52b is greater than that of the current collector 51, and the void factor of the depolarizing mix layers 52a and 52b after pressing is controlled in a range of 10% to 30%.

Conventional electrode sheets are, however, associated with some problems during manufacture, such as breaking and cutting off electrode sheets at a pressing process. At this pressing process, while an electrode sheet is transported by press rollers in the direction indicated by an arrow 53, a portion of the current collector 51 not coated with electrode depolarizing mix is pressed and then a portion of the current collector 51 covered with the depolarizing mix layers 52a and 52b is pressed. The thickness of the electrode sheet to be pressed changes from that of only the current collector 51 to that of all the current collector 51 and depolarizing mix layers 52a and 52b. This thickness change is acute and severe to such an extent that the current collector 51 is broken at a thickness change portion 54.

With such a steep thickness change, it is difficult to form a uniform circle at the winding start portion (portion of the current collector 51 not covered with depolarizing mix layers) of the electrode sheet and a separator wound together at a cell assembly process. Therefore, the final coiled assembly of an electrode sheet and a separator becomes likely to have a deformed cross section.

SUMMARY OF THE INVENTION

It is a first object of the present invention to provide an electrode sheet capable of reducing manufacture troubles such as breakage of the electrode sheet during an electrode manufacture process.

It is a second object of the present invention to provide an electrode sheet capable of providing an improved circularity of a coiled assembly of an electrode sheet and a separator.

It is a third object of the present invention to provide a high capacity secondary cell using the electrode sheet as above.

According to one aspect of the present invention, there is provided an electrode sheet having a current collector coated with electrode depolarizing mix on both upper and lower surfaces of the current collector, wherein: the electrode sheet has a portion of the current collector not coated with the electrode depolarizing mix; and the electrode depolarizing mix coated ends on both the upper and lower surfaces of the current collector are shifted by 0.3 mm or longer and 30 mm or shorter in a longitudinal direction of the electrode sheet.

By shifting the electrode depolarizing mix coated ends on both the front and back surfaces by 0.3 mm or longer and 30 mm or shorter, electrode sheets can be manufactured at high productivity.

DETAILED DESCRIPTION OF THE PREFERRED EMBODIMENTS

An embodiment of the invention will be described by way of example only. The invention is not limited only to this embodiment.

An electrode sheet of this invention can be used with various types of cells. In the following detailed description, a non-aqueous secondary cell using lithium as active material is used illustratively.

FIGS. 1A to 1D are cross sectional views illustrating a method of manufacturing an electrode sheet according to an embodiment of the invention. In this specification, the electrode sheet is a term collectively used for both a positive electrode sheet and a negative electrode sheet. The manufacture method to be described below is applicable to both the positive and negative electrode sheets.

Figure 1A:
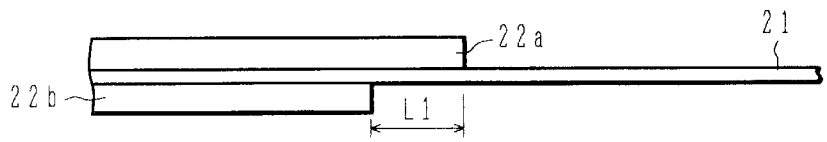
FIGS. 1A to 1D are cross sectional views illustrating an electrode sheet manufacturing method according to an embodiment of the invention.

A current collector 21 is shown in FIG. 1A, with its width being set in the depth direction of the drawing sheet, with its thickness being set in the vertical direction of the drawing sheet, and with its longitudinal direction being set in the horizontal direction. The current collector 21 collects charges and also serves as a support of an electrode sheet. The current collector 21 is made of a rectangular thin strip sheet and has preferably a thickness of about 5 $\mu$m or more and 30 $\mu$m or less.

Materials for the current collector 21 may be aluminum, stainless steel, nickel, titanium or alloys therefor, for the positive electrode, and copper, stainless steel, nickel, titanium or alloys thereof, for the negative electrode. The current collector may have a shape such as a foil, expanded metal, punching metal or net. In particular, preferred are an aluminum foil for the positive electrode and a copper foil for the negative electrode.

A tape 22a is adhered to the upper surface (front surface) of the current collector 21, and another tape 22b is adhered to the lower surface (back surface). The thickness of the tapes 22a and 22b are 10 to 100 μm, preferably 20 to 80 μm, and more preferably 30 to 50 μm. One end of the upper tape 22a is shifted from one end of the lower tape 22b by a length L1 in the longitudinal direction. Either the tape 22a or 22b is made longer (protruded from the other). The length L1 is preferably 0.3 mm or longer and 30 mm or shorter.

Figure 1B:
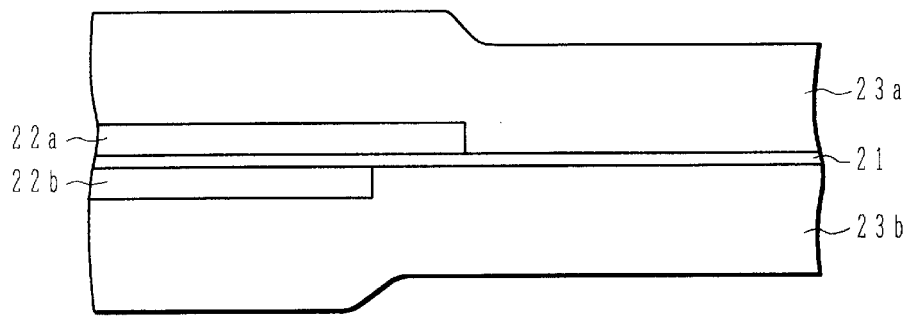

As shown in FIG. 1B, an electrode depolarizing mix 23a is coated covering the upper surfaces of the current collector 21 and tape 22a, and an electrode depolarizing mix 23b is coated covering the lower surfaces of the current collector 21 and tape 22b. The electrode depolarizing mixes 23a and 23b are coated to have predetermined thicknesses after a succeeding dry process and a succeeding press process. The compositions of the electrode depolarizing mixes 23a and 23b will be later described. After the electrode depolarizing mixes are coated, the electrode sheet is dried to be dehydrated. With this dry process, the electrode depolarizing mixes 23a and 23b have voids formed therein and their volumes are increased. FIG. 1B shows the state after the dry process.

Figure 1C:
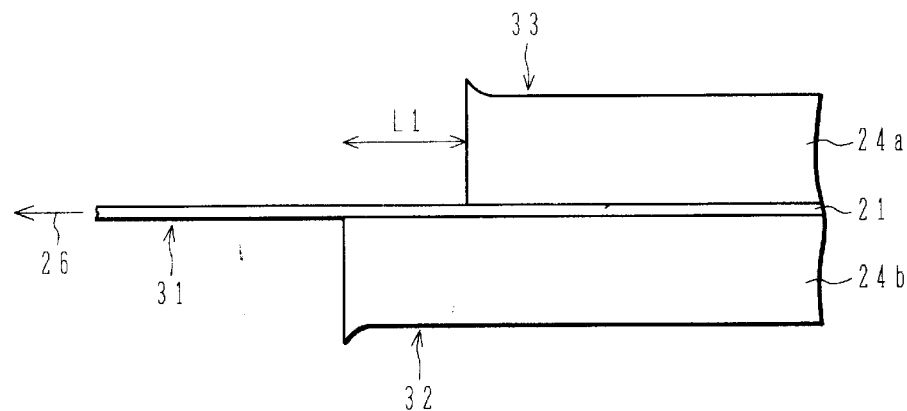

After the dry process, the upper tape 22a and lower tape 22b are peeled off from the current collector 21. The upper tape 22a is peeled off together with the electrode depolarizing mix layer formed thereon, and the lower tape 23a is peeled off together with the electrode depolarizing mix layer formed thereon. As shown in FIG. 1C, an electrode depolarizing layer 24a is left on the upper surface of the current collector 21, and an electrode depolarizing layer 24b is left on the lower surface of the current collector 21. One end of the upper electrode depolarizing layer 24a is displaced from one end of the lower electrode depolarizing layer 24b by the length L1.

After the tapes are removed, the electrode sheet is transported in the direction indicated by an arrow 26 to press it with press rollers in the thickness direction of the electrode sheet. A portion 31 of the electrode sheet not covered with both the electrode depolarizing mix layers 24a and 24b is pressed first, a portion 32 of the electrode sheet covered only with the electrode depolarizing mix layer 24b is pressed next, and a portion 33 of the electrode sheet covered with both the electrode depolarizing mix layers 24a and 24b is pressed last. Since the electrode sheet changes its thickness gradually at the three portions 31, 32 and 33, an impact force to be caused by the thickness change can be alleviated. With an alleviated impact force, accidents of breakage of an electrode sheet during the press process can be reduced.

Figure 1D:
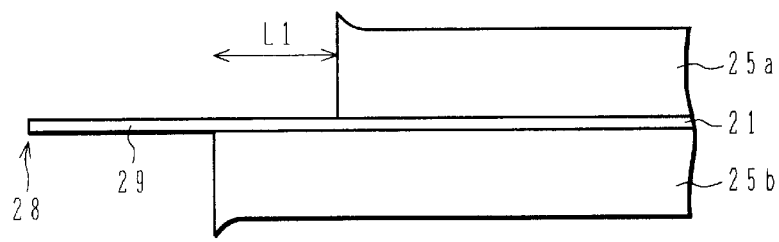

As shown in FIG. 1D, the thicknesses of the electrode depolarizing mix layers 25a and 25b are reduced by the press process. Thereafter, the current collector 21 is cut at a predetermined point 28. The final size of the electrode sheet is as follows. The thickness of the current collector 21 is preferably 5 μm or more and 30 μm or less. The thicknesses of the electrode depolarizing mix layers 25a and 25b are preferably equal to the thickness of the current collector 21 or more, and more preferably 30 μm or more and 400 μm or less. The shift L1 in the longitudinal direction between the electrode depolarizing mix layers 25a and 25b is preferably 0.3 mm or more and 30 mm or less, or more preferably 0.5 mm or more and 10 mm or less. This shift L1 of 0.3 mm or more and 30 mm or less alleviates the problems of breakage of the electrode sheet during a press process and an irregular shape of a coiled assembly. The optimum values for alleviating these problems are different. Namely, the optimum shift amount L1 for avoiding breakage of the electrode sheet during the press process is 0.3 mm or more and 2 mm or less. The shift amount L1 for alleviating the irregular shape of a coiled assembly is preferably 2 mm or more and 10 mm or less, and the optimum shift amount is 3 mm or more and 7 mm or less.

By adjusting the positions of the tapes 22a and 22b on the current collector 21 in the above manner, the shift amount L1 can be regulated highly precisely. Only one end of the electrode sheet is shown in FIGS. 1A to 1D. The other end of the electrode sheet may have various configurations as will be later described with referent to FIGS. 4A to 4C. The right and left ends of an electrode sheet can be formed by the above-described manufacture method. For the general background of the electrode sheet manufacture method, for example, refer to Japanese patent application No. 9-42655 filed on Feb. 26, 1997, which is herein incorporated by reference.

Figure 4A:
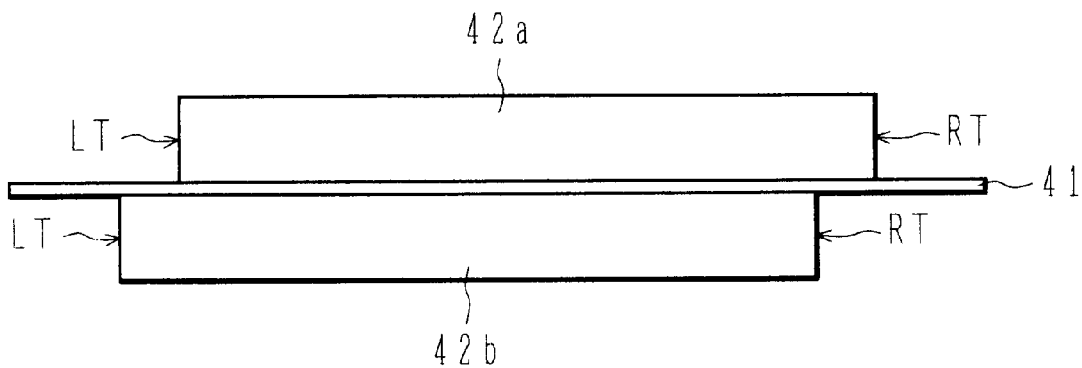
FIGS. 4A to 4C are cross sectional views of electrode sheets according to modifications of the embodiment.
Figure 4B:
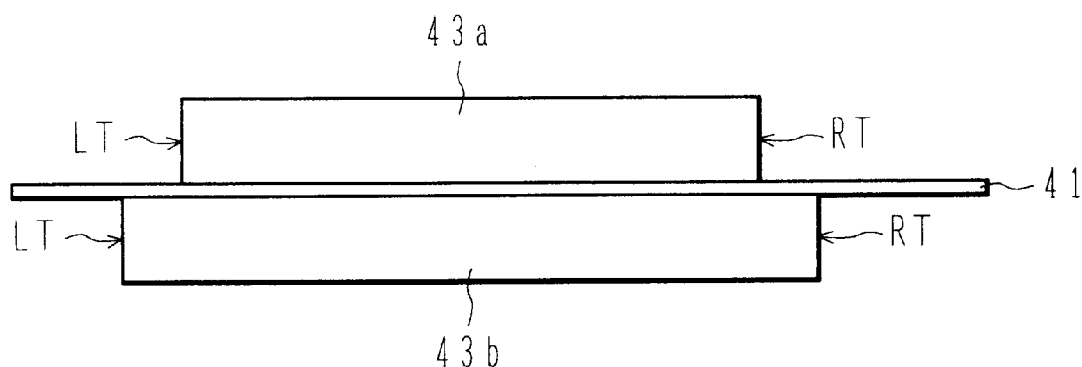
Figure 4C:
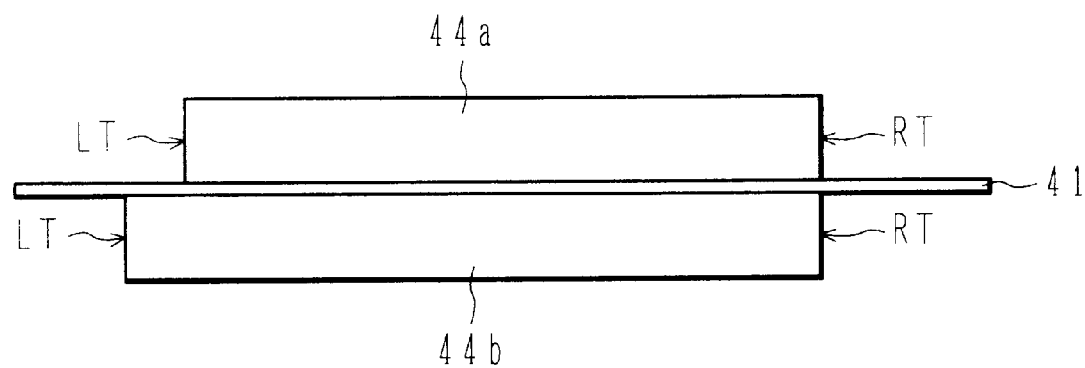

FIGS. 4A to 4C show the whole structure of each of other types of electrode sheets, particularly the relationship between a current collector and electrode depolarizing mix layers formed on the upper and lower surfaces of the current collector.

As shown in FIG. 4A, an electrode depolarizing mix layer 42a is formed on the upper surface of a current collector 41, and an electrode depolarizing mix layer 42b is formed on the lower surface of the current collector 41. As compared to the lower electrode depolarizing mix layer 42b, the left end LT of the upper electrode depolarizing mix layer 42a is shifted to the right (toward the center of the electrode sheet), and the right end RT thereof is shifted to the right (toward the right end of the electrode sheet). The cross sections of the electrode sheet at both ends in the longitudinal direction are in translational symmetry with each other. The lengths of the electrode depolarizing mix layers 42a and 42b are generally equal.

As shown in FIG. 4B, an electrode depolarizing mix layer 43a is formed on the upper surface of a current collector 41, and an electrode depolarizing mix layer 43b is formed on the lower surface of the current collector 41. As compared to the lower electrode depolarizing mix layer 43b, the left end LT of the upper electrode depolarizing mix layer 43a is shifted to the right (toward the center of the electrode sheet), and the right end RT thereof is shifted to the left (toward the center of the electrode sheet). The cross sections of the electrode sheet at both ends in the longitudinal direction are in mirror symmetry with each other.

As shown in FIG. 4C, an electrode depolarizing mix layer 44a is formed on the upper surface of a current collector 41, and an electrode depolarizing mix layer 44b is formed on the lower surface of the current collector 41. As compared to the lower electrode depolarizing mix layer 44b, the left end LT of the upper electrode depolarizing mix layer 44a is shifted to the right (toward the center of the electrode sheet), whereas the right end RT thereof is flush with the right end of the lower electrode depolarizing mix layer 44b. In the longitudinal direction of the electrode sheet, only the left ends LT of the electrode depolarizing mix layers 44a and 44b are displaced and the right ends RT are not displaced or are displaced by less than 0.3 mm.

Various shift amounts may be formed as shown in FIGS. 4A to 4C. The relationship between the current collector and electrode depolarizing mix layers shown in FIG. 4A is particularly preferable because the lengths of the electrode depolarizing mix layers are nearly equal so that the manufacture process can be simplified.

The shift amount L1 of the electrode depolarizing mix layers of an electrode sheet can be regulated by adjusting the positions of adhered tapes as described above. The shift amount L1 may be set by different methods. For example, without adhering tapes on a current collector, the start positions of the processes of coating electrode depolarizing mix on the upper and lower surfaces of the current collector may be controlled to adjust the shift amount L1. Further, a tape may be adhered to one surface to automatically determine the coating start position, while the other surface does not use a tape but the start position of the process of coating electrode depolarizing mix is controlled. Furthermore, the shift amount L1 may be provided by mechanically cutting the coating end portions of the uniformly formed electrode depolarizing mix layers.

The portion 29 of the electrode sheet not covered with the electrode depolarizing mix layers shown in FIG. 1D is connected to a lead plate (not shown). A separator is interposed between a positive electrode sheet and a negative electrode sheet formed in the above manner, and this lamination is wound by a winding machine. Since the electrode sheets make their thicknesses gradually change at three steps as described above, they can be easily wound and a coiled assembly thereof having a high circularity can be formed. For the general background of a method of forming a coiled assembly, for example, refer to Japanese patent application No. 9-42655 filed on Feb. 26, 1997, which is herein incorporated by reference.

Figure 2:
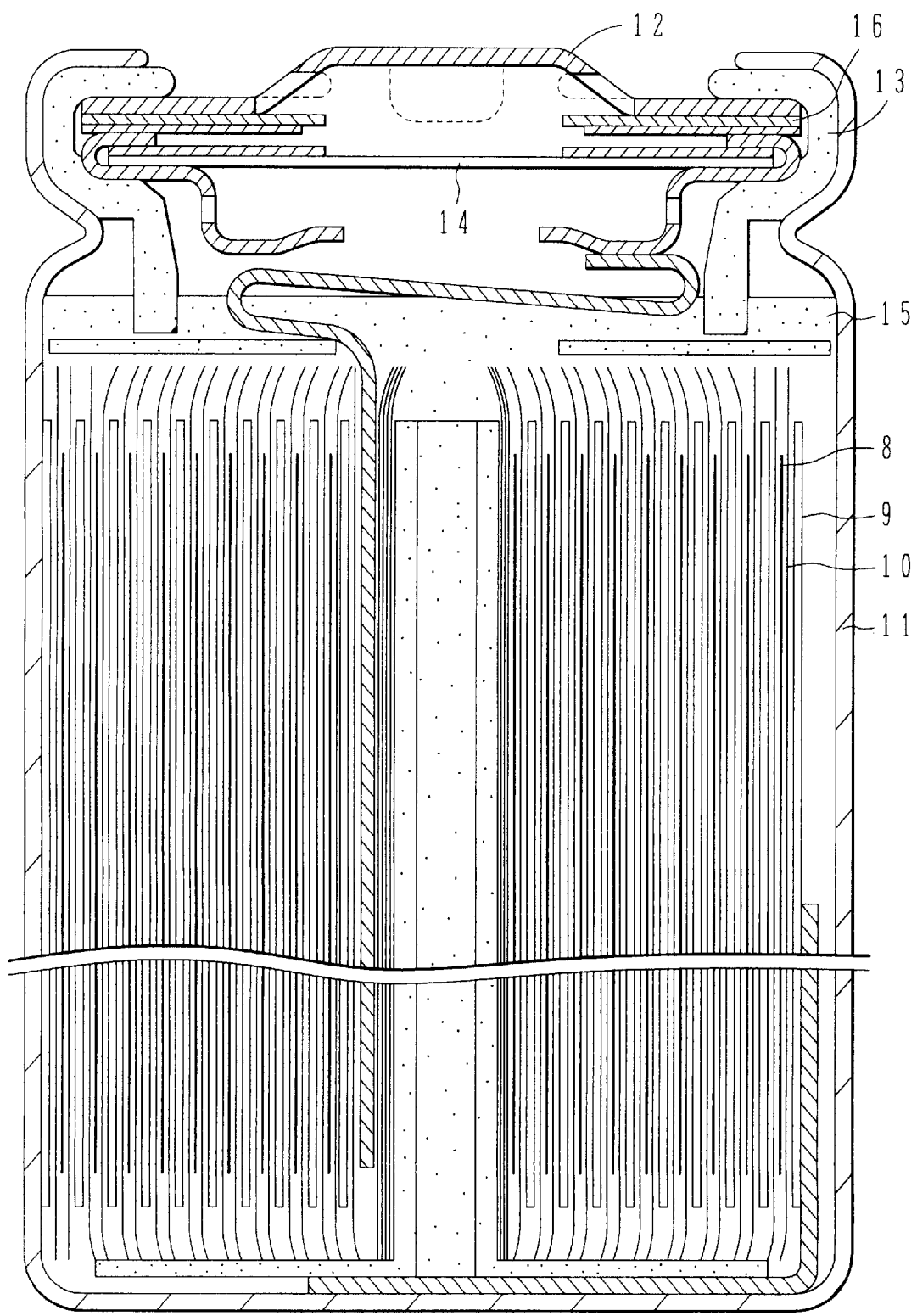
FIG. 2 is a cross sectional view of a cylinder type cell with electrode sheets of the embodiment.
Figure 3:
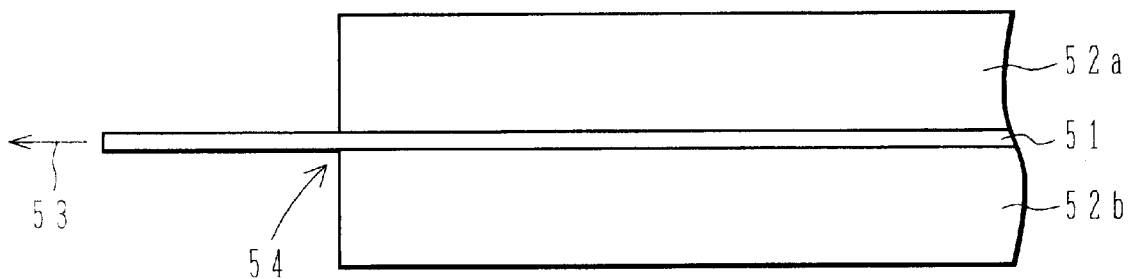
FIG. 3 is a cross sectional view of a conventional electrode sheet.

FIG. 2 is a cross sectional view of a cylinder type cell. The shape of the cell may be a cylinder or a square. Electrode sheets 8 and 9 together with a separator 10 are wound and inserted into a cell can 11. The negative sheet 9 is electrically connected to the can 11. Electrolyte 15 is poured into the inside of the can 11 which is thereafter sealed with a terminal cap 12. The terminal cap 12 serves as the positive electrode terminal and is hermetically fitted in an upper opening of the can 11 by using a gasket 13. The positive sheet 8 is electrically connected to the terminal cap 12. A safety valve plate 14 may be used as a sealing plate. It is preferable to use a positive temperature coefficient (PTC) element 16 for the safety of the cell.

The electrode depolarizing mixes 23a and 23b shown in FIG. 1B are positive electrode depolarizing mixes for the positive electrode sheet, and negative electrode depolarizing mixes for the negative electrode sheet. In addition to the positive or negative electrode active materials, the positive or negative electrode depolarizing mix may comprise a conductivity-imparting agent, a binder, a dispersant, a filler, an ionic conductivity-imparting agent, a pressure increasing agent, and various types of addition agents.

The active materials for positive electrodes may be any materials which allow free absorption and release of a light metal. Lithium-containing transition metal oxides are preferably used as the positive electrode active materials. More preferably, the following materials may be used, including $Li_xCoO_2$, $Li_xNiO_2$, $Li_xCo_aNi_{1-a}O_2$, $Li_xCo_bV_{1-b}O_2$, $Li_xCo_bFe_{1-b}O_2$, $Li_xMn_2O_4$, $Li_xMnO_2$, $LiMn_2O_3$, $Li_xMn_bCO_{2-b}O_z$, $Li_xMn_bNi_{2-b}O_z$, $Li_xMn_bV_{2-b}O_z$ and $Li_xMn_bFe_{1-b}O_z$ (wherein x=0.05 to 1.2, a=0.1 to 0.9, b=0.8 to 0.98 and z=1.5 to 5).

The term "light metal" used in this specification means elements belonging to Group 1A (except for hydrogen) and Group 2A of Periodic Table. The light metal is preferably lithium, sodium and potassium, lithium in particular being preferred.

The negative electrode materials may be any material which allows free absorption and release of a light metal. Examples of such materials are preferably graphite (natural, artificially synthesized and vapor phase grown graphite), coke (derived from coal or petroleum), calcined products of organic polymers (resins or fibers of polyacrylonitrile, furan resins, cresol resins, phenolic resins), calcined products of mesophase pitch, metal oxides, metal chalcogenides, and lithium-containing transition metal oxides and chalcogenides.

Oxides and chalcogenides are preferably made of a material or a combination of materials selected from a group consisting of Ge, Sn, Pb, Bi, Al, Ga, Si and Sb. Amorphous oxides and chalcogenides added with network formers such as $SiO_2$, $B_2O_3$, $P_2O_5$, $Al_2O_3$ and $V_2O_5$ are more preferable. These materials may be stoichiometric compounds or non-stoichiometric compounds.

Preferable examples of such compounds are enumerated in the following only for illustrative purpose.

GeO, $GeO_2$, SnO, $SnO_2$, $SnSiO_3$, PbO, SiO, $Sb_2O_5$, $Bi_2O_3$, $Li_2SiO_3$, $Li_4Si_2O_7$, $Li_2GeO_3$, $SnAl_{0.4}B_{0.5}P_{0.5}K_{0.1}O_{3.65}$, $SnAl_{0.4}B_{0.5}P_{0.5}Cs_{0.1}O_{3.65}$, $SnAl_{0.4}B_{0.5}P_{0.5}K_{0.1}Ge_{0.05}O_{3.85}$, $SnAl_{0.4}B_{0.5}P_{0.5}K_{0.1}Mg_{0.1}Ge_{0.02}O_{3.83}$, $SnAl_{0.4}B_{0.4}P_{0.4}Ba_{0.08}O_{3.28}$, $SnAl_{0.5}B_{0.4}P_{0.5}Mg_{0.1}F_{0.2}O_{3.65}$, $SnAl_{0.4}B_{0.5}P_{0.5}Cs_{0.1}Mg_{0.1}F_{0.2}O_{3.65}$, $SnB_{0.5}P_{0.5}Cs_{0.05}Mg_{0.05}F_{0.1}O_{3.03}$, $Sn_{1.1}Al_{0.4}B_{0.4}P_{0.4}Ba_{0.08}O_{3.34}$, $Sn_{1.2}Al_{0.5}$, $B_{0.3}P_{0.4}Cs_{0.2}O_{3.5}$, $SnSi_{0.5}Al_{0.2}B_{0.1}P_{0.1}Mg_{0.1}O_{2.8}$, $SnSi_{0.5}Al_{0.3}B_{0.4}P_{0.5}O_{4.30}$, $SnSi_{0.6}Al_{0.1}B_{0.1}P_{0.1}Ba_{0.2}O_{2.95}$, $SnSi_{0.6}Al_{0.4}B_{0.2}Mg_{0.1}O_{3.2}$, $Sn_{0.9}Mn_{0.3}B_{0.4}P_{0.4}Ca_{0.1}Rb_{0.1}O_{2.95}$, $Sn_{0.9}Fe_{0.3}B_{0.4}P_{0.4}Ca_{0.1}Rb_{0.1}O_{2.95}$, $Sn_{0.3}Ge_{0.7}Ba_{0.1}P_{0.9}O_{3.35}$, $Sn_{0.9}Mn_{0.1}Mg_{0.1}P_{0.9}O_{3.35}$, and $Sn_{0.2}Mn_{0.8}Mg_{0.1}P_{0.9}O_{3.35}$.

The negative electrode material may contain light metal, particularly lithium. Lithium is preferably added electrochemically, chemically or thermally.

The amount of lithium added to the negative electrode material approximately corresponds to a lithium deposition potential. Lithium of 50 to 700 mol % is preferably added to the negative electrode material. Lithium of 100 to 600 mol % is more preferable.

The conductivity-imparting agent for positive and negative electrodes may be graphite, acetylene black, carbon black, ketchen black, carbon fibers, metal powders, metal fibers or polyphenylene derivatives. Of these materials, graphite and acetylene black are particularly preferred.

The binder for positive and negative electrodes may be polyacrylic acid, carboxymethyl cellulose, polytetrafluoroethylene, polyvinylidene fluoride, polyvinyl alcohol, starch, regenerated cellulose, diacetyl cellulose, hydroxypropyl cellulose, polyvinyl chloride, polyvinyl pyrrolidone, polyethylene, polypropylene, styrene-butadiene rubber (SBR), etylene-propylene-diene methylene linkage (EPDM), sulfonated EPDM, fluororubber, polybutadiene or polyethlene oxide. Of these materials, polyacrylic acid, carboxymethyl cellulose, polytetrafluoroethylene and polyvinylidene fluoride are particularly preferred. These materials are preferably used as water dispersed latex having a grain size of 1 micron or smaller.

The separator 10 (FIG. 2) of the cell may be any insulating thin film having a high ion-permeability and desired mechanical strength, and examples of materials for the separator include olefin polymers, fluoropolymers, cellulosic polymers, polyimides, polyamides, glass fibers and alumina ($Al_2O_3$) fibers which may be used in the form of nonwoven fabrics, woven fabrics and microporous films. In particular, preferred materials are polypropylene, polyethylene, mixture of polypropylene and polyethlene, mixture of polypropylene and Teflon (registered trademark) and mixture of polyethylene and Teflon, and preferred shapes of the separator include microporous films. Particularly preferred are microporous films each having a pore size ranging from 0.01 to 1 μm and a thickness ranging from 5 to 50 μm.

The electrolytes 15 (FIG. 2) usable in the cell are those obtained by dissolving at least one electrolyte selected from the group consisting of $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lithium salts of lower aliphatic carboxylic acids, $LiAlCl_4$, LiCl, LiBr, LiI, chloroborane lithium salt and lithium tetraphenylborate in an organic solvent comprising at least one member selected from the group consisting of propylene carbonate, ethylene carbonate, butylene carbonate dimethyl carbonate, diethyl carbonate, 1, 2-dimethoxyethane, γ-butyrolactone, tetrahydrofuran, 2-methyl tetrahydrofuran, dimethylsulfoxide, dioxolan, 1,3-dioxolan, formamide, dimethylformamide, nitromethane, acetonitrile, methyl formate, methyl acetate, methyl propionate, phosphoric acid triesters, trimethoxymethane, dioxolan derivatives, sulfolane, 3-methyl-2-oxazolidinone, propylene carbonate derivatives, tetrahydrofuran derivatives, diethyl ether and 1,3-propanesultone. Preferred are those obtained by dissolving $LiCF_3SO_3$, $LiClO_4$, $LiBF_4$ and/or $LiPF_6$ in a mixed solvent comprising propylene carbonate or ethylene carbonate and 1,2-dimethoxyethane and/or diethyl carbonate and, in particular, the electrolyte preferably comprises at least ethylene carbonate and $LiPF_6$.

Materials for the can 11 (FIG. 2) of a cell having the bottom may be, for instance, nickel-plated steel plates, stainless steel plates (such as SUS 304, SUS 304L, SUS 304N, SUS 316, SUS 316L, SUS 430 and SUS 444), nickel-plated stainless steel plates (such as those listed above), aluminum or alloys thereof, nickel, titanium and copper, which may be in the form of cylinders having a circular-section, elliptic-section, square-section and rectangular-section. In particular, if the cell can simultaneously serves as a negative terminal, stainless steel plates and nickel-plated steel plates are preferred. While if the cell can simultaneously serves as a positive terminal, stainless steel plates, aluminum or alloys thereof are preferred.

The gaskets 13 (FIG. 2) may be those prepared from olefinic polymers, fluoropolymers, cellulosic polymers, polyimides and polyamides, with olefinic polymers and particularly polymers mainly of propylene being preferred because of high resistance to organic solvents and low water-permeability, and block copolymers of propylene and ethylene being more preferred.

The cell is, if necessary, covered with an armoring material. Examples of such armoring materials are heat-shrinkable tubings, adhesive tapes, metal films, paper, cloths, paint and plastic cases. The armor may be partially composed of a portion which undergoes color change upon heating so that the heat history of the cell during use can be monitored.

A plurality of cells are optionally combined in series or parallel and accommodated in a cell-package. The cell package may be provided with a resistor having a positive temperature coefficient, a temperature fuse and safety elements such as a fuse and/or a current cutoff element as well as a safety circuit (i.e., a circuit having functions for monitoring, for instance, the voltage, temperature and current of each cell and/or a cell assembly and, if necessary, a circuit for cutting off the current). In addition, the cell package may comprise, in addition to positive and negative terminals for the entire cell assembly, external terminals such as positive and negative terminals for each cell, temperature-detecting terminals for the cell assembly and/or each cell and a current-detecting terminal for the cell assembly. Moreover, the cell package may comprise a built-in voltage-conversion circuit (such as DC-DC converter). Further, the connection of each cell may be performed by fixing the cell through welding the lead plate thereof or by fixing it through the use of, for instance, a socket so that it is easily removable. Moreover, the cell package may have a function for displaying the remaining capacity thereof, necessity of charging, number of use or the like.

The cell can be used in various apparatuses. In particular, the cell is preferably used in video movies, portable video decks provided with built-in monitors, movie cameras provided with built-in monitors, compact cameras, single-lens reflex cameras, disposable cameras, films provided with lenses, notebook-type personal computers, notebook-type word processors, electronic notebooks, portable telephones, cordless telephones, shavers, motor-driven tools, motor-driven mixers and motorcars.

The present invention will be described in more detail in connection with specific manufacture processes. The invention is not limited only to the embodiment, but should include various modifications so far as they are not beyond the scope of the present invention.

First, a positive electrode sheet was formed. As shown in FIG. 1A, tapes 22a and 22b were adhered with a shift amount L1 of 5 mm on both surfaces of a positive electrode current collector 21 made of aluminum foil and having a thickness of 20 μm. The thickness of each of the tapes 22a and 22b was 40 μm. $LiCoO_2$ (87 parts by weight) was used as active material for the positive electrode depolarizing mix. This active material was mixed with black lead scales (6 parts by weight) and acetylene black (3 parts by weight) as conductivity-imparting agents and polytetrafluoroethylene (3 parts by weight) dispersed with water and sodium polyacrylic acid (1 part by weight) as binders. The mixture was kneaded with water as a medium to form a slurry. The slurry (positive electrode depolarizing mix) was coated on both surfaces of the positive electrode current collector 21 by an extrusion method. The positive electrode depolarizing mix layers 23a and 23b of 130 μm thick were formed on both the surfaces of the positive electrode current collector 21. After this structure was dried, the tapes 22a and 22b were peeled off. Thereafter, the structure was compression-molded with a calendar press, and cut to form a strip-shaped positive electrode having a width of 56 mm, a length of 400 mm and a thickness of 250 μm. A trouble such as breakage of the positive electrode during the press process did not occur.

Next, a negative electrode sheet was formed. Tapes 22a and 22b were adhered with a shift amount L1 of 0.5 mm on both surfaces of a negative electrode current collector 21 made of copper foil and having a thickness of 18 μm. The thickness of each of the tapes 22a and 22b was 40 μm. Tin monoxide (73.3 parts by weight), carbon dioxide silicon (19.5 parts by weight), magnesium oxide (3.5 parts by weight) and boron oxide (3.7 parts by weight) were dry-mixed, baked for 10 hours at 1200° C. under an argon atmosphere, cooled and pulverized to form $SnSi_{0.6}Mg_{0.2}B_{0.2}O_{2.7}$ having an average grain size of 4.5 μm, as negative electrode material.

For the negative electrode depolarizing mix, the above negative electrode material (88 parts by weight) was mixed with black lead scales (6 parts by weight) as conductivity-imparting agent and polyvinylidene fluoride (4 parts by weight) dispersed with water, carboxymethyl cellulose (1 part by weight) and lithium acetate (1 part by weight) as binders. The mixture was kneaded with water as a medium to form a slurry. The slurry (negative electrode depolarizing mix 23a and 23b) was coated on both surfaces of the positive electrode current collector 21 by an extrusion method. Similar to the positive electrode, after the dry process, tape peeling process, compression-mold process and cut process, the negative electrode having a width of 58 mm, a length of 440 mm and a thickness of 78 µm was obtained. A trouble such as breakage of the negative electrode during the press process did not occur.

Before the above-described cutting process, the positive and negative electrodes C-1 and A-1 were dried and dehydrated in a low humidity atmosphere (dew point: −50° C.) for 2 hours at 200 to 250° C. with a far infrared heater. Thereafter, a nickel lead plate was ultrasonic-welded to the negative electrode sheet (copper current collector) at the area not covered with the electrode depolarizing mix layer. A lead plate was ultrasonic-welded to the positive electrode current collector (aluminum current collector) of 20 µm thick at the exposed area. The welded portions of the leads were protected by attaching an adhesive tape made of polyimide as a base material and silicon-containing adhesive agent. As shown in FIG. 2, the positive electrode sheet 8 with the lead, a microporous polyethylene film separator 10 and the negative electrode sheet 9 with the lead were stacked one upon another and wound by a winding machine. The winding was able to perform smoothly and a coiled assembly of the electrodes with a high circularity was able to obtain.

This wound roll was housed in a cylindrical cell can 11 having a bottom and made of nickel plated iron. Electrolyte 15 was poured into the cell can 11. The electrolyte contained 0.9 mol $LiPF_6$ and 0.1 mol $LiBF_4$ per one liter and solvent of ethylene carbonate, dimethyl carbonate, diethyl carbonate and ethyl propionate with a volume ratio of 2:4:3:1. A cell lid 12 having a positive terminal was caulked to the cell can 11 via a gasket 13 to form a cylindrical cell. At earlier process stages, the positive terminal 12 was connected to a positive electrode sheet 8 and the cell can was connected to a negative electrode sheet 9 by lead wires. Reference numeral 14 represents a safety valve. With the above processes, a cell was manufactured.

With the above electrode sheets, manufacture troubles such as deformed shape did not occur during the roller pressing and winding. A plurality of cells were formed with different shifts L1 of the electrode depolarizing mix layers on current collectors. Some of a plurality of cells with a shift L1 of 0.1 mm of the positive electrode had troubles of breakage during the press process, and some of them had a coiled assembly deformed and unable to be housed in the cell can. Cells with the shift L1 in excess of 30 mm did not have such troubles, but the cell capacity lowered greatly. The shift is therefore preferably 0.3 mm or more and 30 mm or less.

As described above, by forming the electrode depolarizing mix layers on both surfaces of a current collector with a shift amount L1, troubles such as breakage of the electrode sheet during the electrode sheet manufacture (particularly during the press process) can be reduced. Furthermore, since the electrode sheets can be wound at a high circularity and housed in a cell can, the manufacture of cells becomes easy and the performance and efficiently of cells can be improved.

The present invention has been described in connection with the preferred embodiments. The invention is not limited only to the above embodiments. It is apparent that various modifications, improvements, combinations, and the like can be made by those skilled in the art.

What is claimed is:

1. An electrode sheet having a current collector coated with electrode depolarizing mix on both upper and lower surfaces of the current collector, wherein:

the electrode sheet has portions of the current collector not coated with the electrode depolarizing mix at both ends of the upper and lower surfaces of the current collector; and the electrode depolarizing mix coated ends on both the upper and lower surfaces of the current collector are offset relative to one another and are shifted by 0.3 mm or longer and 30 mm or shorter in a longitudinal direction of the electrode sheet.

2. An electrode sheet according to claim 1, wherein cross sections of the electrode depolarizing mix coated first and second ends in the longitudinal direction of the electrode sheet are symmetrical on both upper and lower surfaces of the electrode sheet.

3. An electrode sheet according to claim 1, wherein a thickness of the current collector is 5 µm or more and 30 µm or less.

4. An electrode sheet according to claim 1, wherein a thickness of the electrode depolarizing mix coated on both upper and lower surfaces of the electrode sheet and dried is greater than a thickness of the current collector.

5. An electrode sheet according to claim 1, wherein the electrode depolarizing mix coated first and second ends on both the upper and lower surfaces have a shift of 0.5 mm or more and 10 mm or less in the longitudinal direction of the electrode sheet.

6. An electrode sheet according to claim 1, wherein first and second ends of the electrode depolarizing mix on both the upper and lower surfaces have a shift of 0.3 mm or more and 30 mm or less in the longitudinal direction of the electrode sheet.

7. An electrode sheet according to claim 1, wherein the first ends of the electrode depolarizing mix on both the upper and lower surfaces have a shift of 0.3 mm or more and 30 mm or less in the longitudinal direction of the electrode sheet, and the second ends of the electrode depolarizing mix have a shift of 0 or more and less than 0.3 mm.

8. An electrode sheet according to claim 1, wherein the current collector is made of aluminum or copper.

9. An electrode sheet according to claim 3, wherein a thickness of the electrode depolarizing mix coated on both upper and lower surfaces of the electrode sheet and dried is 30 µm or more and 400 µm or less.

10. An electrode sheet according to claim 5, wherein the electrode depolarizing mix coated first and second ends on both the upper and lower surfaces have a shift of 0.3 mm or more and 2 mm or less in the longitudinal direction of the electrode sheet.

11. An electrode sheet according to claim 5, wherein the electrode depolarizing mix coated first and second ends on both the upper and lower surfaces have a shift of 2 mm or more and 10 mm or less in the longitudinal direction of the electrode sheet.

* * * * *